(12) United States Patent
Sheehan

(10) Patent No.: US 8,046,826 B2
(45) Date of Patent: *Oct. 25, 2011

(54) RESOURCE SERVER PROXY METHOD AND SYSTEM

(75) Inventor: Alexander Brantley Sheehan, Atlanta, GA (US)

(73) Assignee: International Business Machines Corporation, Armonk, NY (US)

( * ) Notice: Subject to any disclaimer, the term of this patent is extended or adjusted under 35 U.S.C. 154(b) by 798 days.

This patent is subject to a terminal disclaimer.

(21) Appl. No.: 12/049,483

(22) Filed: Mar. 17, 2008

(65) Prior Publication Data

US 2009/0235343 A1    Sep. 17, 2009

(51) Int. Cl.
   *H04L 29/02* (2006.01)
(52) U.S. Cl. .............................. 726/6; 726/7
(58) Field of Classification Search .................. None
   See application file for complete search history.

(56) References Cited

U.S. PATENT DOCUMENTS

| | | | | |
|---|---|---|---|---|
| 6,449,643 | B1 | 9/2002 | Hyndman et al. | |
| 6,453,339 | B1* | 9/2002 | Schultz et al. | 709/206 |
| 6,609,198 | B1* | 8/2003 | Wood et al. | 713/155 |
| 2003/0005178 | A1* | 1/2003 | Hemsath | 709/328 |
| 2003/0033523 | A1* | 2/2003 | McNulty et al. | 713/168 |
| 2003/0041263 | A1* | 2/2003 | Devine et al. | 713/201 |
| 2003/0149880 | A1* | 8/2003 | Shamsaasef et al. | 713/182 |
| 2003/0172290 | A1* | 9/2003 | Newcombe et al. | 713/200 |
| 2004/0006710 | A1* | 1/2004 | Pollutro et al. | 713/201 |
| 2004/0187036 | A1* | 9/2004 | Nakamura | 713/202 |
| 2006/0070114 | A1 | 3/2006 | Wood et al. | |
| 2006/0212706 | A1* | 9/2006 | Jiang et al. | 713/176 |
| 2007/0214497 | A1 | 9/2007 | Montgomery et al. | |
| 2007/0248232 | A1 | 10/2007 | Driscoll et al. | |
| 2007/0277235 | A1 | 11/2007 | Barrett et al. | |
| 2009/0222665 | A1 | 9/2009 | Sheehan | |
| 2009/0234954 | A1 | 9/2009 | Sheehan | |
| 2009/0235338 | A1 | 9/2009 | Sheehan | |

OTHER PUBLICATIONS

U.S. Appl. No. 12/039,839, filed Feb. 29, 2008; First Named Inventor: Alexander Brantley Sheehan; Confirmation No. 8281.
U.S. Appl. No. 12/045,735, filed Mar. 11, 2008; First Named Inventor: Alexander Brantley Sheehan; Confirmation No. 9834.
U.S. Appl. No. 12/045,741, filed Mar. 11, 2008; First Named Inventor: Alexander Brantley Sheehan; Confirmation No. 9853.
Office Action (Mail Date Apr. 11, 2011) for U.S. Appl. No. 12/045,735, filed Mar. 11, 2008; First Named Inventor: Alexander Brantley Sheehan; Confirmation No. 9834.

(Continued)

*Primary Examiner* — David Pearson
(74) *Attorney, Agent, or Firm* — Schmeiser, Olsen & Watts; John R. Pivnichny

(57) ABSTRACT

A resource request method and system. The method includes receiving by resource server software application, session key life data. The resource server software application receives from a requester, an authentication request, a session ID, and an address associated with the requestor. The resource server software application transmits the session ID and a request for groups associated with the request. The resource server software application receives group IDs. The resource server software application generates a session key associated with the requester. The resource server software application calculates a specified lifetime associated with the session key. The resource server software application stores the session key, the session ID, the address, the group IDs, and the specified lifetime. The resource server software application transmits to the requester, the session key.

22 Claims, 5 Drawing Sheets

OTHER PUBLICATIONS

Webster's Online Dictionary, "Definition: interactivity." http://www.websters-dictionary-online.org/definitions/interactivity.

Office Action (Mail Date Aug. 22, 2011) for U.S. Appl. No. 12/045,741, Filing Date Mar. 11, 2008.

Office Action (Mail Date Aug. 23, 2011) for U.S. Appl. No. 12/045,735, Filing Date Mar. 11, 2008.

Office Action (Mail Date Aug. 4, 2011) for U.S. Appl. No. 12/039,839, Filing Date Feb. 29, 2008.

* cited by examiner

RESOURCE SERVER PROXY METHOD AND SYSTEM

FIELD OF THE INVENTION

The present invention relates to a method and associated system for providing a secure role-based means for handling requests for resources.

BACKGROUND OF THE INVENTION

Handling data requests between systems typically comprises an inefficient process with little flexibility. Accordingly, there exists a need in the art to overcome at least some of the deficiencies and limitations described herein above.

SUMMARY OF THE INVENTION

The present invention provides a resource request method comprising:

initializing, by a computing system comprising a resource server software application, said resource server software application, wherein said resource server software application comprises an internal session cache;

receiving, by said resource server software application, first configuration data, wherein said configuration data comprises session key life data;

receiving, by said resource server software application from a first requester, a first authentication request, first credentials data associated with said first requester, and a first address associated with said first requester, wherein said first credentials data comprises a first session ID;

transmitting, by said resource server software application to a user directory, said first credentials data and a first request for groups associated with said first requestor;

receiving, by said resource server software application from said user directory, first group IDs identifying a first group associated with said first requester;

generating, by said resource server software application, a first session key associated with said first requestor;

calculating, by said resource server software application, a first specified lifetime associated with said first session key, wherein said calculating said first specified lifetime comprises adding said session key life data to a first current time;

storing within said internal session cache, by said resource server software application, said first session key, said first session ID, said first address, said first group IDs, and said first specified lifetime; and transmitting, by said resource server software application to said first requester, said first session key.

The present invention provides a computing system comprising a processor coupled to a computer-readable memory unit, said memory unit comprising a resource server software application and instructions that when executed by the processor implements a resource request method, said method comprising:

initializing, by said computing system, said resource server software application, wherein said resource server software application comprises an internal session cache;

receiving, by said resource server software application, first configuration data, wherein said configuration data comprises session key life data;

receiving, by said resource server software application from a first requester, a first authentication request, first credentials data associated with said first requestor, and a first address associated with said first requester, wherein said first credentials data comprises a first session ID;

transmitting, by said resource server software application to a user directory, said first credentials data and a first request for groups associated with said first requestor;

receiving, by said resource server software application from said user directory, first group IDs identifying a first group associated with said first requester;

generating, by said resource server software application, a first session key associated with said first requester;

calculating, by said resource server software application, a first specified lifetime associated with said first session key, wherein said calculating said first specified lifetime comprises adding said session key life data to a first current time;

storing within said internal session cache, by said resource server software application, said first session key, said first session ID, said first address, said first group IDs, and said first specified lifetime; and transmitting, by said resource server software application to said first requester, said first session key.

The present invention advantageously provides a simple method and associated system capable of maintaining secure connections between systems.

DETAILED DESCRIPTION OF THE INVENTION

Figure 1:
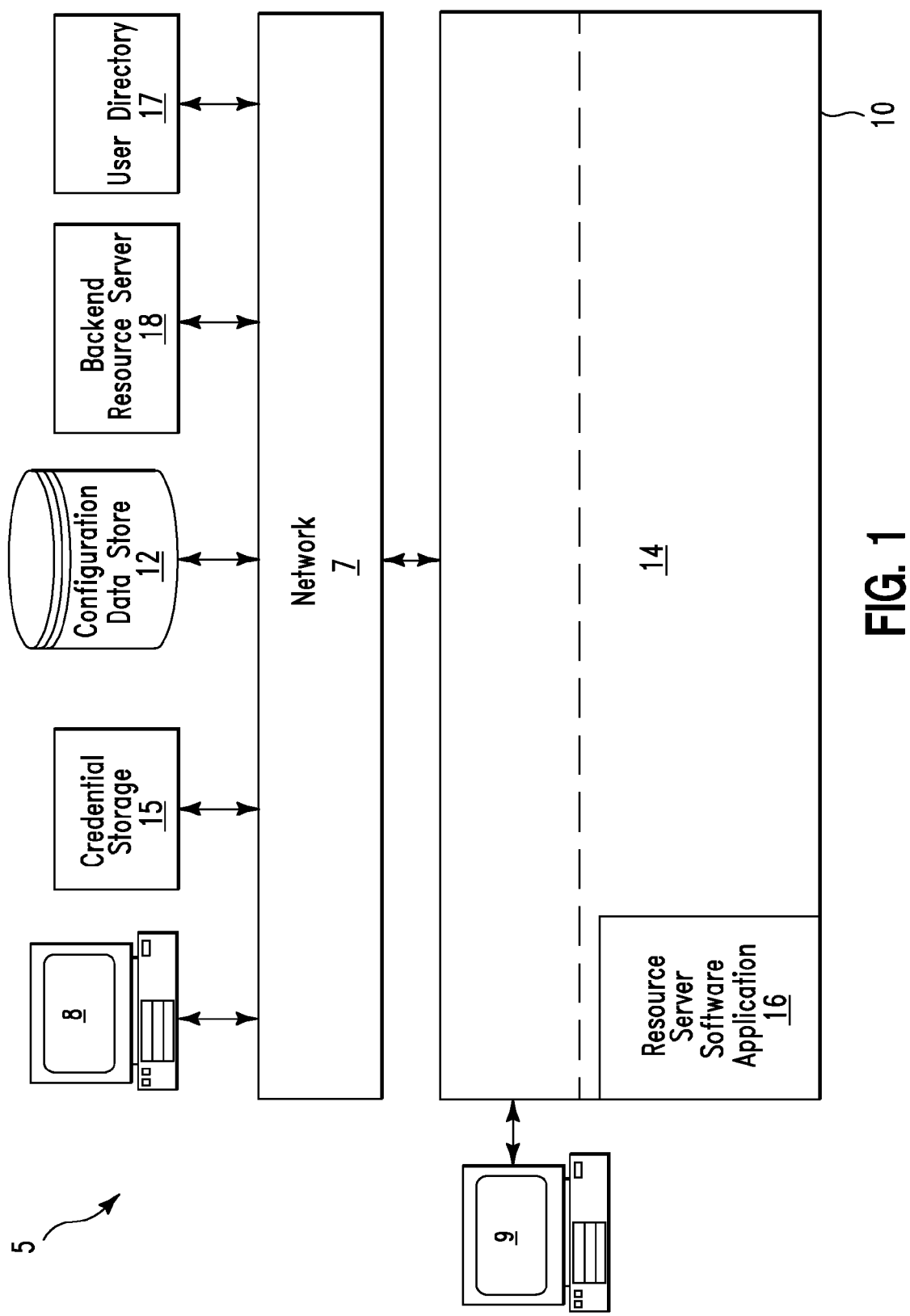
FIG. 1 illustrates a system 5 for providing a secure, role based means for handling requests for resources, in accordance with embodiments of the present invention.

FIG. 1 illustrates a system 5 for providing a secure, role based means for handling requests for resources, in accordance with embodiments of the present invention. System 5 of FIG. 1 comprises a computing apparatus 8, a (secure) credential storage device 15, a configuration data store 12, a backend resource server, and a user directory 17 connected to a resource server 10 (e.g., a session-key-secured computing resource server) through a network 7. User directory 17 provides authentication services and returns groups for authenticated requesters. Credential storage device 15 may comprise a single storage device or a plurality of storage devices. Configuration data store 12 may comprise a single data store or a plurality of data stores. Network 7 may comprise any type of network including, inter alia, a local area network, (LAN), a wide area network (WAN), the Internet, etc. Resource server 10 may comprise any type of computing system(s) including, inter alia, a personal computer (PC), a server computer, a database computer, etc. Resource server 10 comprises a memory system 14 (e.g., an application server). Memory system 14 may comprise a single memory system (e.g., a single application server). Alternatively, memory system 14 may comprise a plurality of memory systems (e.g., multiple application servers). Memory system 14 comprises a resource server software application 18. Computing apparatus 8 may comprise, inter alia, a personal computer, a laptop computer, a computer terminal, etc. Computing apparatus 8 may comprise a single computing apparatus or a plurality of computing apparatuses. Computing apparatus 8 is used by requesters (i.e., entities that request resources) in order to request a resource(s) (e.g., an application menu item) from resource server 16. Requestors may comprise people, software applications, or portions of software applications. System 5 may comprise an optional access terminal 9 connected to resource server 10. Optional access terminal 9 may be used to access resource server software application 16. Resource server software application 16 comprises application software that services requests for resources from requestors. Resource server software application 16 generates session keys, manages an internal session cache (e.g., internal session cache 16b in FIG. 4), forwards requests to backend resource server 18, and returns results (i.e., resources) to the requester.

System 5 retrieves credentials (e.g., a session ID and password) for requesters (i.e., looking to request resources) from credential storage device 15 and submits the credentials to resource server 10 which generates and returns a session key as a result of a successful authentication attempt with user directory 17. A session key is defined herein as a string of characters that acts as a ticket to access resources in resource server 16. Resource server software application 16 stores the session key, a session ID, group IDs (i.e., for groups associated with requesters), a specified lifetime for stored session keys, and requester addresses.

Resource server software application 16 handles requests from requesters. Resource server software application 16 performs the following functions:
1. Assists with authentication of requesters.
2. Generates session keys for authenticated requesters and populates related data in its internal session cache for the authenticated requesters.
3. Retrieves resources from backend resource server 18 on behalf of the requestor.
4. Removes old session data from its internal session cache.

The following process steps illustrate a session key generation and transfer process performed by system 5:
1. Resource server software application 16 retrieves configuration data (e.g., data associated with a session key life variable) from (secure) configuration data store 12.
2. Resource server software application 16 retrieves credentials (e.g., a session ID and password for requesters) from (secure) credential storage device 15.
2. Resource server software application 16 transmits (i.e., using an encrypted communication channel) the credentials and a groups request (i.e., for groups associated with the requester) to user directory 17.
3. Resource server software application 16 receives (i.e., from user directory 17) groups associated with the requester.
4. Resource server software application 16 generates, stores, and manages session keys. Additionally, resource server software application 16 stores the session ID, the groups associated with the requester, an address associated with the requestor, and a lifetime associated with the session key.
5. The session key is transmitted to the requester.
6. The requestor transmits a request for resources and the session key resource server software application 16.
7. After resource server software application 16 authenticates the requester, resource server software application 16 retrieves the requested resources, generates a new session key, and transmits the requested resources and the new session key back to the requester.

A periodic process is performed to determine if a current session key (and session data) should be updated. The aforementioned process steps are repeated for multiple requestors.

Figure 2:
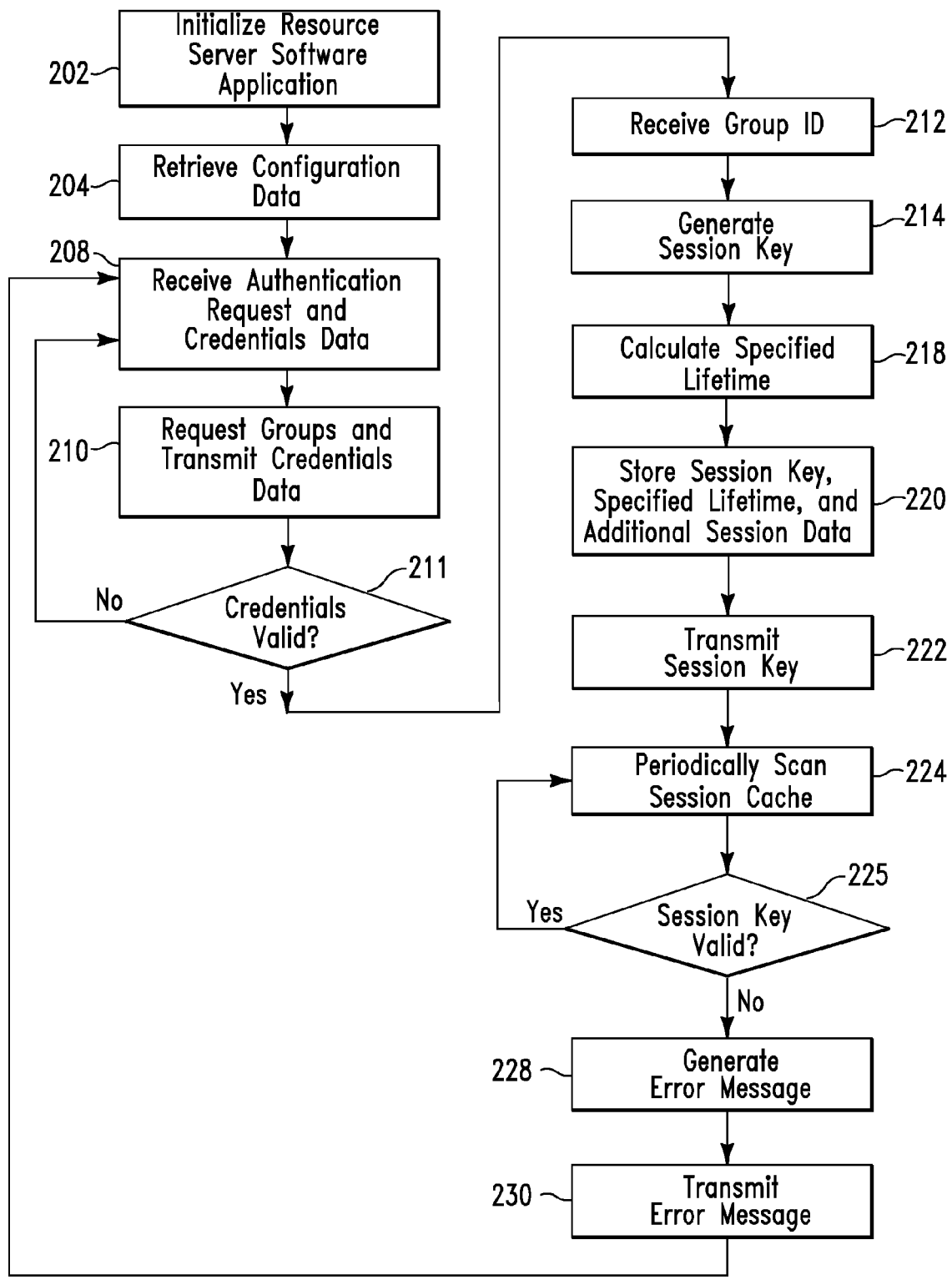
FIG. 2 illustrates a flowchart describing an algorithm used by the system of FIG. 1 for generating and updating session keys for requesters, in accordance with embodiments of the present invention.

FIG. 2 illustrates a flowchart describing an algorithm used by system 5 of FIG. 1 for generating and updating session keys for requesters, in accordance with embodiments of the present invention. In step 202, resource server software application 16 (i.e., from FIG. 1) is initialized. In step 204, resource server software application 16 retrieves configuration data from a configuration data store (e.g., configuration data store 12 in FIG. 1). Configuration data may comprise data associated with a session key life variable. In step 208, receiving, resource server software application 16 receives (i.e., from a first requester using an encrypted communications channel), an authentication request, credentials data associated with the first requester, and an address (i.e., computer related address such as, inter alia, an Internet protocol (IP) address) associated with said first requester. The credentials data may include a session ID associated with the requestor. In step 210, resource server software application 16 transmits (i.e., to a user directory such as user directory 17 in FIG. 1) the credentials data and a request for groups associated with the requester. In step 211, the user directory determines if the credentials data is valid. If in step 211, the user directory determines that the credentials data is not valid then step 208 is repeated to retrieve valid credentials data. If in step 211, the user directory determines that the credentials data is valid then in step 212 the user directory transmits (i.e., to resource server software application 16) group IDs identifying any number of groups associated with the requester. In step 214, resource server software application 16 generates a session key associated with the requester. In step 218, resource server software application 16 calculates a specified lifetime for the session key. The specified lifetime is calculated by adding the session key life data (i.e., from the configuration data) to a current time. The specified lifetime comprises a valid remaining lifetime for the session key generated in step 214. In step 220, resource server software application 16 stores session data comprising the session key, the session ID, the address, the group IDs, and the specified lifetime in an internal (i.e., internal to resource server software application 16) session cache. In step 222, the session key is transmitted to the requester for use when attempting to retrieve resources (i.e., as described with respect to FIG. 3). In step 224, resource server software application 16 periodically scans the internal session cache. In step 225, resource server software application 16 determines (i.e., based on the scan performed in step 224) if the session key is still valid (i.e., the specified lifetime has expired). If in step 225, resource server software application 16 determines that the session key is still valid then step 224 is repeated. If in step 225, resource server software application 16 determines that the session key is not still valid then in step 228 an error message indicating that a valid session key for this requester no longer exists. In step 230, the error message is transmitted to the requester (i.e., when the requestor attempts to request a resource) and step 208 is repeated in order to authenticate the requester and generate a new session key. The above described process steps (i.e., steps 202 . . . 230) illustrated in the algorithm of FIG. 2 are repeated for different requesters and that may submit requests for resources.

Figure 3:
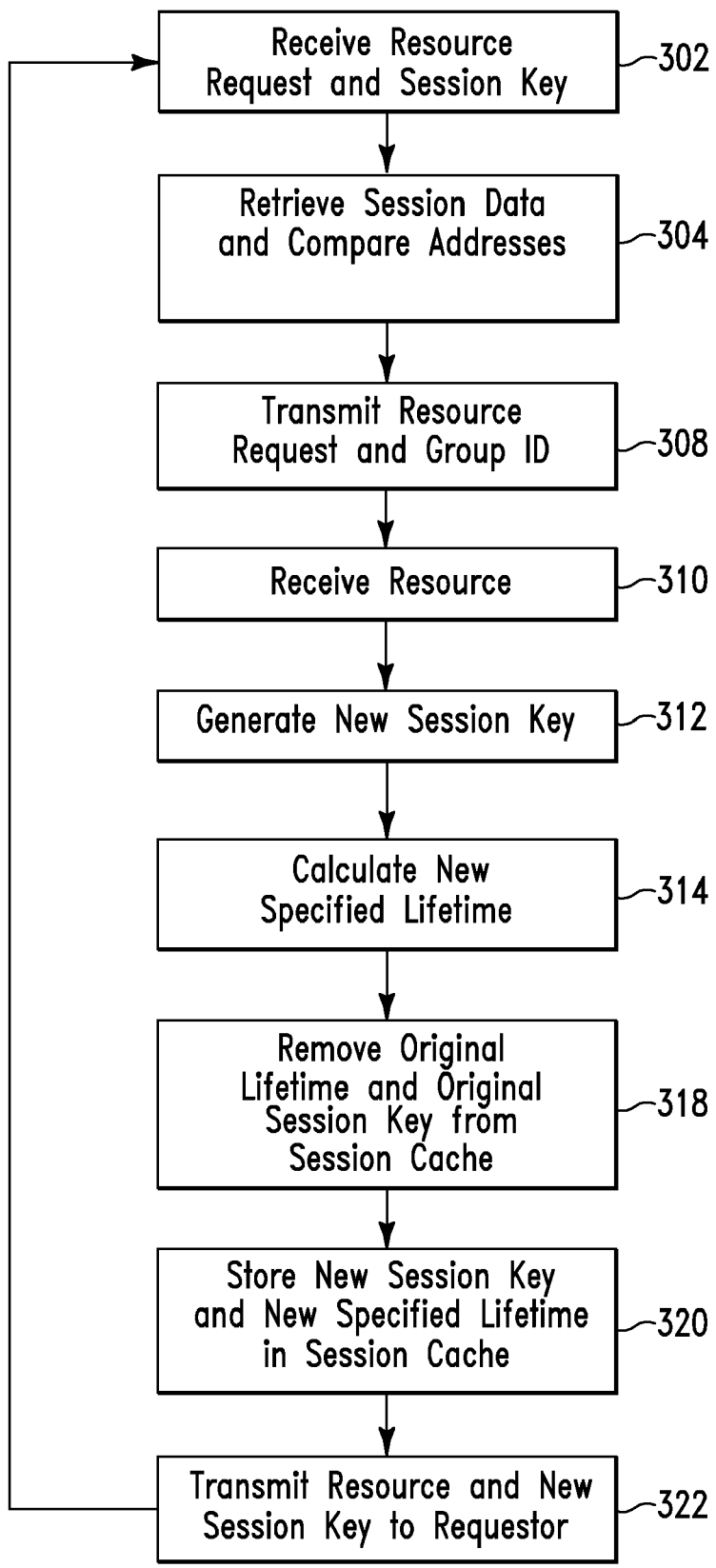
FIG. 3 illustrates a flowchart describing an algorithm used by the system of FIG. 1 for executing a resource request, in accordance with embodiments of the present invention.

FIG. 3 illustrates a flowchart describing an algorithm used by system 5 of FIG. 1 for executing a resource request, in accordance with embodiments of the present invention. In step 302, resource server software application 16 (i.e., from FIG. 1) receives (i.e., from a requestor) a session key and a resource request. In step 304, resource server software application 16 retrieves session data (i.e., stored in step 220 in the algorithm of FIG. 2) associated with the requester from the internal session cache and compares the address (i.e., from the session data) stored in the session cache to a current source address associated with the requester to determine a match. In step 308, (i.e., when a match is determined in step 304) resource server software application 16 transmits (i.e., to a backend resource server such as backend resource server 18 in FIG. 1) the resource request from step 302 and group IDs (i.e., from the session data) associated with the requester. In step 310, (i.e., based on a trust relationship (e.g., mutual security sockets layer (SSL) configuration) between the resource server and the backend resource server) the backend resource server transmits a requested resource to the resource server. In step 312, resource server software application 16 generates a new session key. In step 314, resource server software application 16 generates a new specified lifetime associated with the new session key. The new specified lifetime is calculated by adding session key life data (i.e., from the configuration data) to a current time. In step 318, the original session key and the original specified lifetime is removed from the internal session cache. In step 320, the new session key and the new specified lifetime is stored in the internal session cache. In step 322, resource server software application 16 transmits the new session key and the requested resource to the requestor and the process is repeated for a same requestor and/or different requesters.

Figure 4:
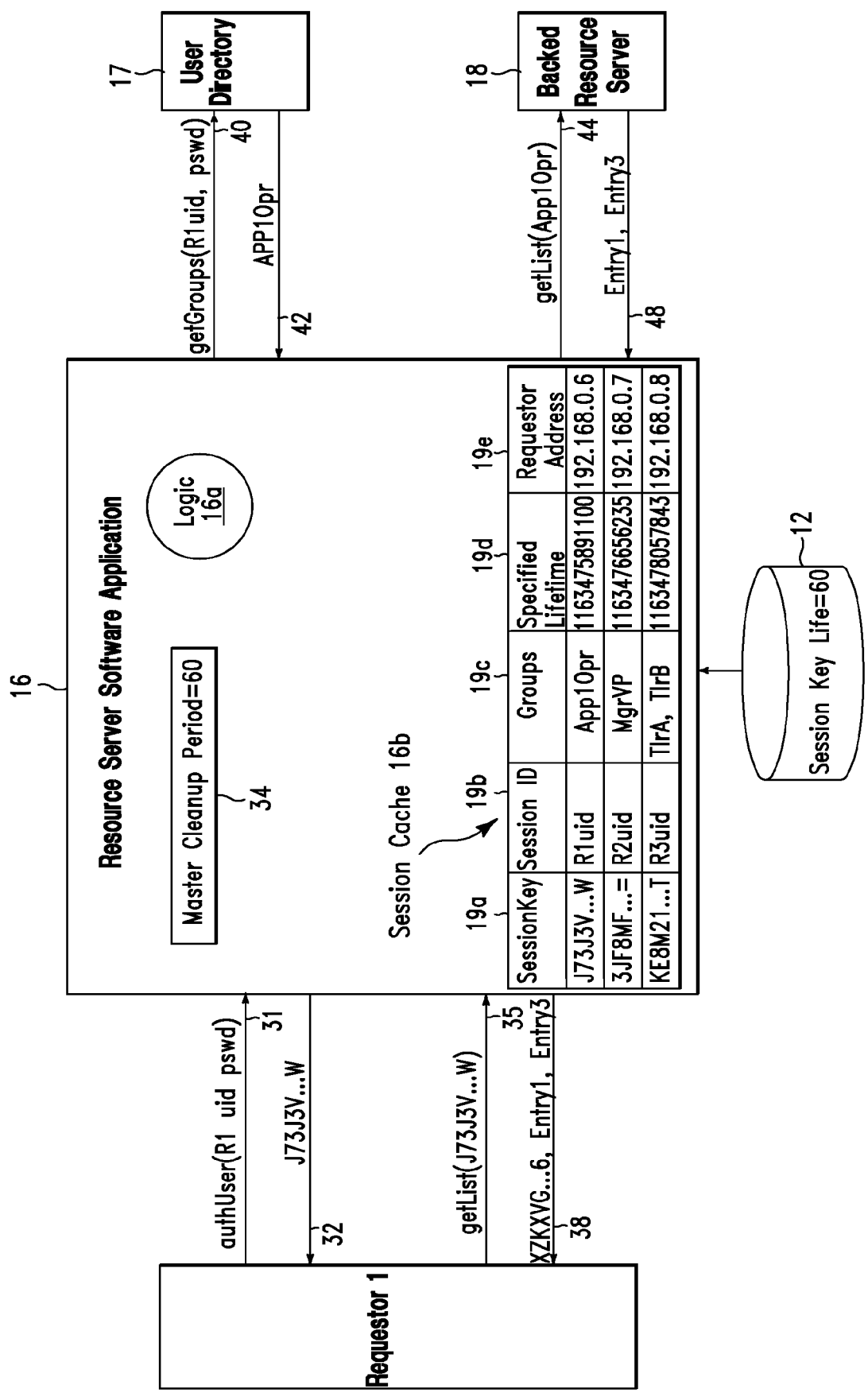
FIG. 4 which includes illustrates a component diagram describing a usage process for implementing the algorithms of FIGS. 2 and 3, in accordance with embodiments of the present invention.

FIG. 4 illustrates a component diagram describing a usage process for implementing the algorithms of FIGS. 2 and 3 for generating session keys and handling requests for resources, in accordance with embodiments of the present invention. Resource server software application 16 comprises internal logic 16a (i.e., for performing logical functions for resource server software application 16) and a (internal) session cache 16b for storing session data and session keys. Session cache 16b is an internal data structure within resource server software application 16 memory space where the logic 16a stores session data. Upon a successful groups/authentication credentials 40 attempt (e.g., getGroups(R1uid, pswd)), logic 16a will generate a session key (e.g., "J73J3V . . . W") which may comprise a randomly generated sequence of characters, and will store the session key along with a session Id (e.g., R1uid), groups (e.g., App1Opr) returned by the backend resource server 18, a specified lifetime (e.g., 1163475891100), and a requestor address (e.g., 192.168.0.6) which may comprise an IP address from which an initial credentials/authentication request 31 (e.g., authUser(R1uid, pswd)) request originated. Logic 16a will store the aforementioned session data in its session cache 16b. Master cleanup period 34 comprises a period of time that logic 16a will wait between scans of session cache 16b for expired sessions. If logic 16a finds specified lifetime data that is a current time or older, then logic 16a will remove that session data from session cache 16b. Backend resource server is an entity (i.e., located behind resource server software application 16) which stores resource attribute data. The resource attribute data is stored by group. For example, resource attributes 48 (Entry1, Entry1) may be associated with group 42 (App1Opr) and resource attributes EntryA, EntryC may be associated with the groups Mgr, VP.

Prior to executing the process described with respect to FIG. 4 (i.e., as described, infra), secure communication channels are established between requesters (e.g., requestor 1) and resource server software application 16 and between resource server software application 16 and backend resource server 18. When the resource server software application 16 initializes, it reads configuration data (i.e., comprising a session key life value from configuration data store 12 and stores the session key life value in a master cleanup period variable 34. At this point, resource server software application 16 is ready to service requests for resources from requesters to and backend resource server 18.

The following process steps illustrate a process for handling resource requests:

1. Requestor 1 is a software application that sends requests for resources to resource server software application 16. An encrypted channel for communications between Requestor 1 and resource server software application 16 is initially established prior to Requestor 1 transmitting resource requests to resource server software application 16.

2. Requestor 1 transmits its credentials/authentication request 31 (e.g., authUser(R1uid, pswd)). to resource server software application 16.

3. Resource server software application 16 transmits a request for groups/authentication credentials 40 (e.g., getGroups (R1uid, pswd) to user directory 40.

4. Groups 42 (e.g., Appr1Opr) associated with the authenticated requester (e.g., Requestor1) are returned to the resource server software application 16 by user directory 17.

5. Resource server software application 16 returns a new session key 32 (e.g., J73J3V . . . W) to Requestor 1 upon a successful authentication request.

6. Requestor 1 transmits a request for resources/session key 35 (e.g., getList(J73J3V . . . W)) to resource server software application 16.

7. Resource server software application 16 looks up session data using a session key (e.g., J73J3V . . . W) and verifies that a source address in session cache 16b matches a source address of Requestor 1. Assuming the source address of the requester matches the address in the session cache for the session key that was sent by the requestor, resource server software application 16 submits the request for resources/ groups 44 (i.e., using an encrypted communication channel) associated with that session (e.g., getList(App1Opr)) to the backend resource server 18 for processing.

8. Backend resource server returns resource attributes 48 (Entry1, Entry2) to resource server software application 16 in response to request for resources/groups 44.

9. Upon receiving the requested resources from the backend resource server 18, logic 16a generates a new session key and specified lifetime which it stores in the session records (i.e., in session cache 16b) with the matching original session key (i.e., replacing the original session key with the newly created session key) and returns resource attributes/new session key 38 (e.g., XZKXVG . . . 6, Entry1,Entry3) to Requestor 1.

Figure 5:
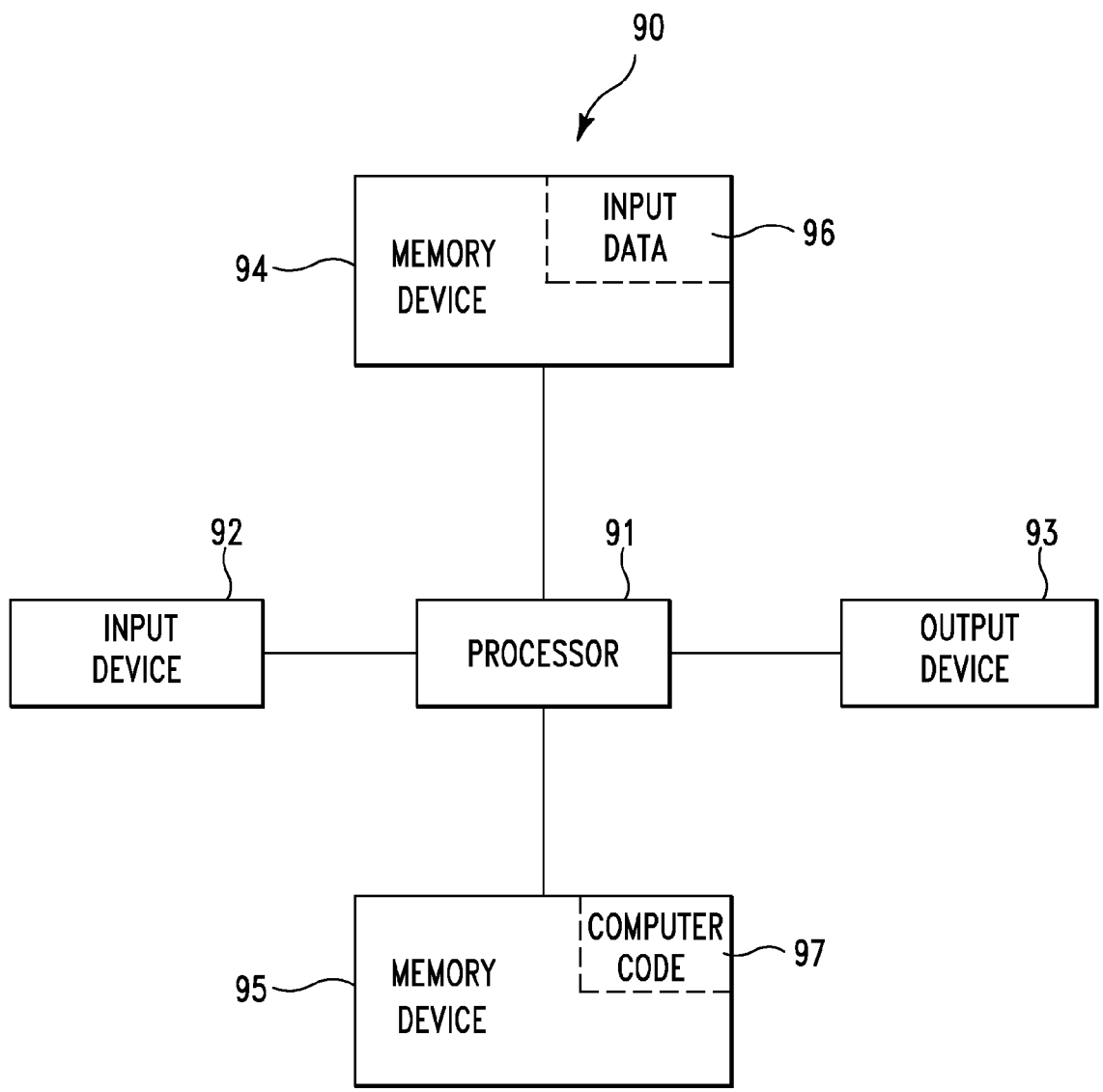
FIG. 5 illustrates a computer apparatus used for generating session keys and handling requests for resources, in accordance with embodiments of the present invention.

FIG. 5 illustrates a computer apparatus 90 (e.g., resource server 10 of FIG. 1) used for generating session keys and handling requests for resources, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a software application, a mouse, etc. The output device 93 may be, inter alia, a printer, a plotter, a computer screen, a magnetic tape, a removable hard disk, a floppy disk, a software application, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithms of FIGS. 2 and 3) for generating session keys and handling requests for resources. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 5) may comprise the algorithms of FIGS. 2 and 3 and may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise said computer usable medium (or said program storage device).

Still yet, any of the components of the present invention could be created, integrated, hosted, maintained, deployed, managed, serviced, etc. by a service provider who offers to generate session keys and handle requests for resources. Thus the present invention discloses a process for deploying, creating, integrating, hosting, maintaining, and/or integrating computing infrastructure, comprising integrating computer-readable code into the computer system 90, wherein the code in combination with the computer system 90 is capable of performing a method for generating session keys and handling requests for resources. In another embodiment, the invention provides a business method that performs the process steps of the invention on a subscription, advertising, and/or fee basis. That is, a service provider, such as a Solution Integrator, could offer to provide a secure means to generate session keys and handle requests for resources. In this case, the service provider can create, maintain, support, etc. a computer infrastructure that performs the process steps of the invention for one or more customers. In return, the service provider can receive payment from the customer(s) under a subscription and/or fee agreement and/or the service provider can receive payment from the sale of advertising content to one or more third parties.

While FIG. 5 shows the computer system 90 as a particular configuration of hardware and software, any configuration of hardware and software, as would be known to a person of ordinary skill in the art, may be utilized for the purposes stated supra in conjunction with the particular computer system 90 of FIG. 5. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A resource request method comprising:
    initializing, by a computing system comprising a resource server software application, said resource server software application, wherein said resource server software application comprises an internal session cache, and wherein said internal session cache comprises an internal data structure within said resource server software application;
    receiving, by said resource server software application, first configuration data, wherein said configuration data comprises session key life data comprising a session key life variable;
    receiving, by said resource server software application from a first requestor, a first authentication request, first credentials data associated with said first requestor, and a first address associated with said first requestor, wherein said first credentials data comprises a first session ID;
    transmitting, by said resource server software application to a user directory, said first credentials data and a first request for groups associated with said first requestor;
    receiving, by said resource server software application from said user directory, first group IDs identifying a first group associated with said first requestor;
    generating, by said resource server software application, a first session key associated with said first requestor, wherein said first session key comprises a randomly generated sequence of characters;
    calculating, by a computer processor executing said resource server software application, a first specified lifetime associated with said first session key, wherein said calculating said first specified lifetime comprises adding said session key life data to a first current time;
    storing within said internal session cache, by said resource server software application, said first session key, said first session ID, said first address, said first group IDs, and said first specified lifetime;
    periodically determining, by said resource server software application, if said first session key and said session key life data should be updated, wherein said periodically determining is associated with a master cleanup period comprising a specified period of time that said resource server software application will wait between scans of said internal session cache for expired sessions;
    establishing, by said resource server software application, a secure communication channel between said first requestor, said resource server software application, and a backend resource server;
    transmitting, by said resource server software application to said first requestor based on said results of said periodically determining, said first session key.

2. The method of claim 1, further comprising:
    receiving after said transmitting said first session key, by said resource server software application from said first requestor, a first resource request and said first session key;
    comparing, by said resource server software application, said first address in said session cache with a first source address associated with said first requestor to determine a first match;
    transmitting, by said resource server software application to a backend resource server, said first resource request and said first group IDs;
    receiving, by said resource server software application from said backend resource server, a first resource associated with said first resource request;
    generating, by said resource server software application, a second session key associated with said first requestor;
    calculating, by said resource server software application, a second specified lifetime associated with said second session key, wherein said calculating said second specified lifetime comprises adding said session key life data to a second current time;
    removing said first session key and said first specified lifetime from said resource server software application;
    storing within said internal session cache, by said resource server software application, said second session key and said second specified lifetime; and
    transmitting, by said resource server software application to said first requestor, said second session key and said first resource.

3. The method of claim 2, further comprising:
receiving, by said resource server software application from a second requestor, a second authentication request, second credentials data associated with said second requestor, and a second address associated with said second requestor, wherein said second credentials data comprises a second session ID;
transmitting, by said resource server software application to a user directory, said second credentials data and a second request for groups associated with said second requestor;
receiving, by said resource server software application from said user directory, second group IDs identifying a second group associated with said second requestor;
generating, by said resource server software application, a third session key associated with said second requestor;
calculating, by said resource server software application, a third specified lifetime associated with said third session key, wherein said calculating said third specified lifetime comprises adding said session key life data to a third current time; and
storing within said internal session cache, by said resource server software application, said third session key, said second session ID, said second address, said second group IDs, and said third specified lifetime.

4. The method of claim 3, further comprising:
transmitting, by said resource server software application to said second requestor, said third session key;
receiving after said transmitting said third session key, by said resource server software application from said second requestor, a second resource request and said third session key;
comparing, by said resource server software application, said second address in said session cache with a second source address associated with said second requestor to determine a second match;
transmitting, by said resource server software application to said backend resource server, said second resource request and said second group IDs;
receiving, by said resource server software application from said backend resource server, a second resource associated with said second resource request;
generating, by said resource server software application, a fourth session key associated with said second requestor;
calculating, by said resource server software application, a fourth specified lifetime associated with said second session key, wherein said calculating said fourth specified lifetime comprises adding said session key life data to a second current time;
removing said third session key and said third specified lifetime from said resource server software application;
storing within said internal session cache, by said resource server software application, said second session key and said fourth specified lifetime; and
transmitting, by said resource server software application to said second requestor, said fourth session key and said second resource.

5. The method of claim 1, further comprising:
periodically scanning, by said resource server software application, said internal session cache to determine if said first specified lifetime has expired.

6. The method of claim 5, wherein said periodically scanning determines that said first specified lifetime has expired, and wherein said method further comprises:
removing, by said resource server software application from said internal session cache, said first session key, said first session ID, said first address, said first group IDs, and said first specified lifetime.

7. The method of claim 6, further comprising:
receiving, by said resource server software application from said first requestor, a first resource request and said first session key; and
transmitting, by said resource server software application to said first requestor, an error message indicating that said first specified lifetime has expired.

8. The method of claim 7, further comprising:
receiving, by said resource server software application from said first requestor, a second authentication request, second credentials data associated with said first requestor, and a second address associated with said first requestor, wherein said second credentials data comprises a second session ID;
transmitting, by said resource server software application to a user directory, said second credentials data and a second request for groups associated with said first requestor;
receiving, by said resource server software application from said user directory, said first group IDs identifying said first group associated with said first requestor;
generating, by said resource server software application, a second session key associated with said first requestor;
calculating, by said resource server software application, a second specified lifetime associated with said second session key, wherein said calculating said second specified lifetime comprises adding said session key life data to a second current time; and
storing within said internal session cache, by said resource server software application, said second session key, said second session ID, said second address, said first group IDs, and said second specified lifetime.

9. The method of claim 8, further comprising:
transmitting, by said resource server software application to said first requestor, said second session key;
receiving after said transmitting said second session key, by said resource server software application from said first requestor, a second resource request and said second session key;
comparing, by said resource server software application, said second address in said session cache with a first source address associated with said first requestor to determine a first match;
transmitting, by said resource server software application to a backend resource server, said second resource request and said first group IDs;
receiving, by said resource server software application from said backend resource server, a first resource associated with said second resource request;
generating, by said resource server software application, a third session key associated with said first requestor;
calculating, by said resource server software application, a third specified lifetime associated with said third session key, wherein said calculating said third specified lifetime comprises adding said session key life data to a third current time;
removing said second session key and said second specified lifetime from said resource server software application;
storing within said internal session cache, by said resource server software application, said third session key and said third specified lifetime; and
transmitting, by said resource server software application to said first requestor, said third session key and said first resource.

10. The method of claim 1, wherein said first credentials data comprises a user ID and password for said first requestor.

11. A process for supporting computer infrastructure, said process comprising providing at least one support service for at least one of creating, integrating, hosting, maintaining, and deploying computer-readable code in said computing system, wherein the code in combination with said computing system is capable of performing the method of claim 1.

12. A computing system comprising a computer processor coupled to a computer-readable memory unit, said memory unit comprising a resource server software application and instructions that when executed by the computer processor implements a resource request method, said method comprising:

- initializing, by said computing system, said resource server software application, wherein said resource server software application comprises an internal session cache, and wherein said internal session cache comprises an internal data structure within said resource server software application;
- receiving, by said resource server software application, first configuration data, wherein said configuration data comprises session key life data comprising a session key life variable;
- receiving, by said resource server software application from a first requestor, a first authentication request, first credentials data associated with said first requestor, and a first address associated with said first requestor, wherein said first credentials data comprises a first session ID;
- transmitting, by said resource server software application to a user directory, said first credentials data and a first request for groups associated with said first requestor;
- receiving, by said resource server software application from said user directory, first group IDs identifying a first group associated with said first requestor;
- generating, by said resource server software application, a first session key associated with said first requestor, wherein said first session key comprises a randomly generated sequence of characters;
- calculating, by said computer processor executing said resource server software application, a first specified lifetime associated with said first session key, wherein said calculating said first specified lifetime comprises adding said session key life data to a first current time;
- storing within said internal session cache, by said resource server software application, said first session key, said first session ID, said first address, said first group IDs, and said first specified lifetime;
- periodically determining, by said resource server software application, if said first session key and said session key life data should be updated, wherein said periodically determining is associated with a master cleanup period comprising a specified period of time that said resource server software application will wait between scans of said internal session cache for expired sessions;
- establishing, by said resource server software application, a secure communication channel between said first requestor, said resource server software application, and a backend resource server;
- transmitting, by said resource server software application to said first requestor based on said results of said periodically determining, said first session key.

13. The computing system of claim 12, wherein said method further comprises:

- receiving after said transmitting said first session key, by said resource server software application from said first requestor, a first resource request and said first session key;
- comparing, by said resource server software application, said first address in said session cache with a first source address associated with said first requestor to determine a first match;
- transmitting, by said resource server software application to a backend resource server, said first resource request and said first group IDs;
- receiving, by said resource server software application from said backend resource server, a first resource associated with said first resource request;
- generating, by said resource server software application, a second session key associated with said first requestor;
- calculating, by said resource server software application, a second specified lifetime associated with said second session key, wherein said calculating said second specified lifetime comprises adding said session key life data to a second current time;
- removing said first session key and said first specified lifetime from said resource server software application;
- storing within said internal session cache, by said resource server software application, said second session key and said second specified lifetime; and
- transmitting, by said resource server software application to said first requestor, said second session key and said first resource.

14. The computing system of claim 13, wherein said method further comprises:

- receiving, by said resource server software application from a second requestor, a second authentication request, second credentials data associated with said second requestor, and a second address associated with said second requestor, wherein said second credentials data comprises a second session ID;
- transmitting, by said resource server software application to a user directory, said second credentials data and a second request for groups associated with said second requestor;
- receiving, by said resource server software application from said user directory, second group IDs identifying a second group associated with said second requestor;
- generating, by said resource server software application, a third session key associated with said second requestor;
- calculating, by said resource server software application, a third specified lifetime associated with said third session key, wherein said calculating said third specified lifetime comprises adding said session key life data to a third current time; and
- storing within said internal session cache, by said resource server software application, said third session key, said second session ID, said second address, said second group IDs, and said third specified lifetime.

15. The computing system of claim 14, wherein said method further comprises:

- transmitting, by said resource server software application to said second requestor, said third session key;
- receiving after said transmitting said third session key, by said resource server software application from said second requestor, a second resource request and said third session key;
- comparing, by said resource server software application, said second address in said session cache with a second source address associated with said second requestor to determine a second match;

transmitting, by said resource server software application to said backend resource server, said second resource request and said second group IDs;
receiving, by said resource server software application from said backend resource server, a second resource associated with said second resource request;
generating, by said resource server software application, a fourth session key associated with said second requestor;
calculating, by said resource server software application, a fourth specified lifetime associated with said second session key, wherein said calculating said fourth specified lifetime comprises adding said session key life data to a second current time;
removing said third session key and said third specified lifetime from said resource server software application;
storing within said internal session cache, by said resource server software application, said second session key and said fourth specified lifetime; and
transmitting, by said resource server software application to said second requestor, said fourth session key and said second resource.

16. The computing system of claim 12, wherein said method further comprises:
periodically scanning, by said resource server software application, said internal session cache to determine if said first specified lifetime has expired.

17. The computing system of claim 16, wherein said periodically scanning determines that said first specified lifetime has expired, and wherein said method further comprises:
removing, by said resource server software application from said internal session cache, said first session key, said first session ID, said first address, said first group IDs, and said first specified lifetime.

18. The computing system of claim 17, wherein said method further comprises:
receiving, by said resource server software application from said first requestor, a first resource request and said first session key; and
transmitting, by said resource server software application to said first requestor, an error message indicating that said first specified lifetime has expired.

19. The computing system of claim 18, wherein said method further comprises:
receiving, by said resource server software application from said first requestor, a second authentication request, second credentials data associated with said first requestor, and a second address associated with said first requestor, wherein said second credentials data comprises a second session ID;
transmitting, by said resource server software application to a user directory, said second credentials data and a second request for groups associated with said first requestor;
receiving, by said resource server software application from said user directory, said first group IDs identifying said first group associated with said first requestor;
generating, by said resource server software application, a second session key associated with said first requestor;
calculating, by said resource server software application, a second specified lifetime associated with said second session key, wherein said calculating said second specified lifetime comprises adding said session key life data to a second current time; and
storing within said internal session cache, by said resource server software application, said second session key, said second session ID, said second address, said first group IDs, and said second specified lifetime.

20. The computing system of claim 19, wherein said method further comprises:
transmitting, by said resource server software application to said first requestor, said second session key;
receiving after said transmitting said second session key, by said resource server software application from said first requestor, a second resource request and said second session key;
comparing, by said resource server software application, said second address in said session cache with a first source address associated with said first requestor to determine a first match;
transmitting, by said resource server software application to a backend resource server, said second resource request and said first group IDs;
receiving, by said resource server software application from said backend resource server, a first resource associated with said second resource request;
generating, by said resource server software application, a third session key associated with said first requestor;
calculating, by said resource server software application, a third specified lifetime associated with said third session key, wherein said calculating said third specified lifetime comprises adding said session key life data to a third current time;
removing said second session key and said second specified lifetime from said resource server software application;
storing within said internal session cache, by said resource server software application, said third session key and said third specified lifetime; and
transmitting, by said resource server software application to said first requestor, said third session key and said first resource.

21. The computing system of claim 12, wherein said first credentials data comprises a user ID and password for said first requestor.

22. A computer program product, comprising a computer readable storage device having a computer readable program code embodied therein, said computer readable program code including a resource server software application comprising an algorithm that when executed by a computer processor of a computing system implements a method comprising:
initializing, by said computing system, said resource server software application, wherein said resource server software application comprises an internal session cache, and wherein said internal session cache comprises an internal data structure within said resource server software application;
receiving, by said resource server software application, first configuration data, wherein said configuration data comprises session key life data comprising a session key life variable;
receiving, by said resource server software application from a first requestor, a first authentication request, first credentials data associated with said first requestor, and a first address associated with said first requestor, wherein said first credentials data comprises a first session ID;
transmitting, by said resource server software application to a user directory, said first credentials data and a first request for groups associated with said first requestor;
receiving, by said resource server software application from said user directory, first group IDs identifying a first group associated with said first requestor;

generating, by said resource server software application, a first session key associated with said first requestor, wherein said first session key comprises a randomly generated sequence of characters;

calculating, by said computer processor executing said resource server software application, a first specified lifetime associated with said first session key, wherein said calculating said first specified lifetime comprises adding said session key life data to a first current time;

storing within said internal session cache, by said resource server software application, said first session key, said first session ID, said first address, said first group IDs, and said first specified lifetime;

periodically determining, by said resource server software application, if said first session key and said session key life data should be updated, wherein said periodically determining is associated with a master cleanup period comprising a specified period of time that said resource server software application will wait between scans of said internal session cache for expired sessions;

establishing, by said resource server software application, a secure communication channel between said first requestor, said resource server software application, and a backend resource server;

transmitting, by said resource server software application to said first requestor based on said results of said periodically determining, said first session key.

* * * * *